April 26, 1927.
R. A. FONTAINE
TRANSMISSION MECHANISM
Filed July 13, 1921
1,626,229
2 Sheets-Sheet 1
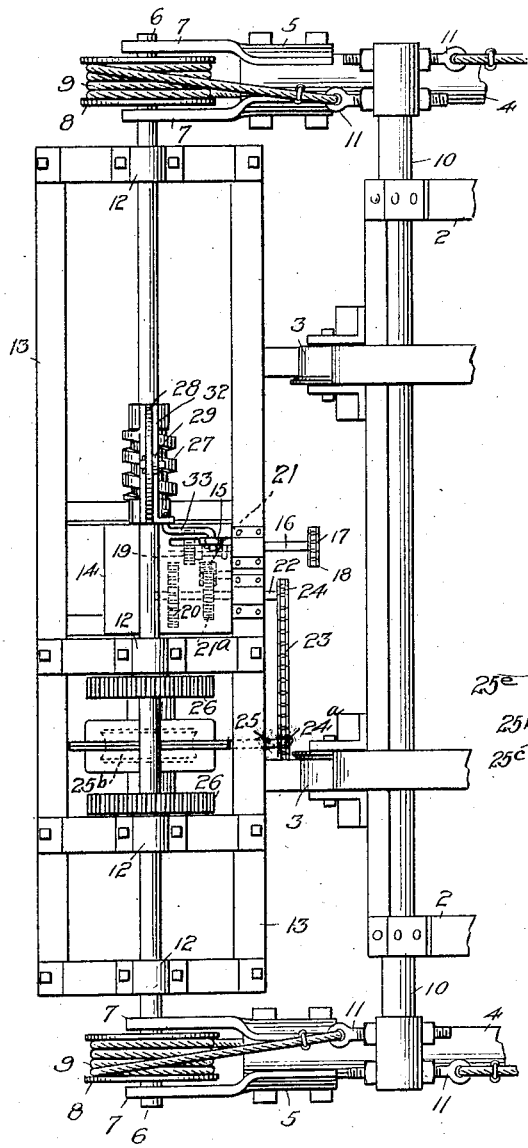
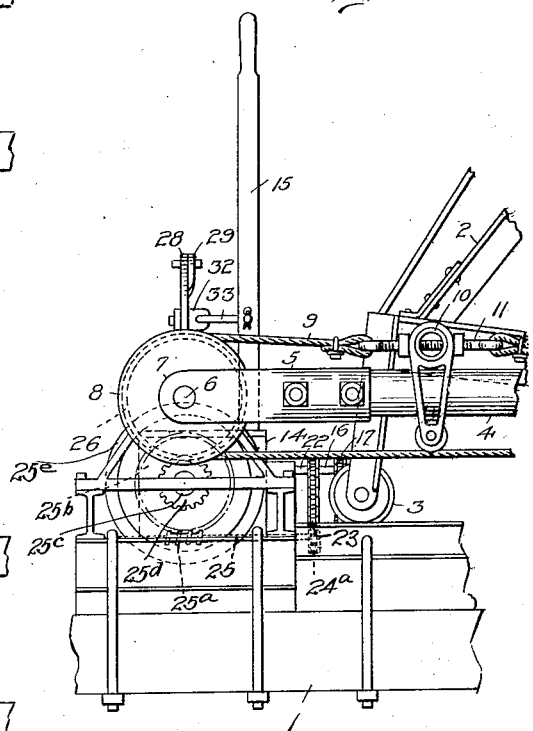
Inventor
Robert A. Fontaine
By
his Attorney April 26, 1927.
R. A. FONTAINE
1,626,229
TRANSMISSION MECHANISM
Filed July 13, 1921 2 Sheets-Sheet 2
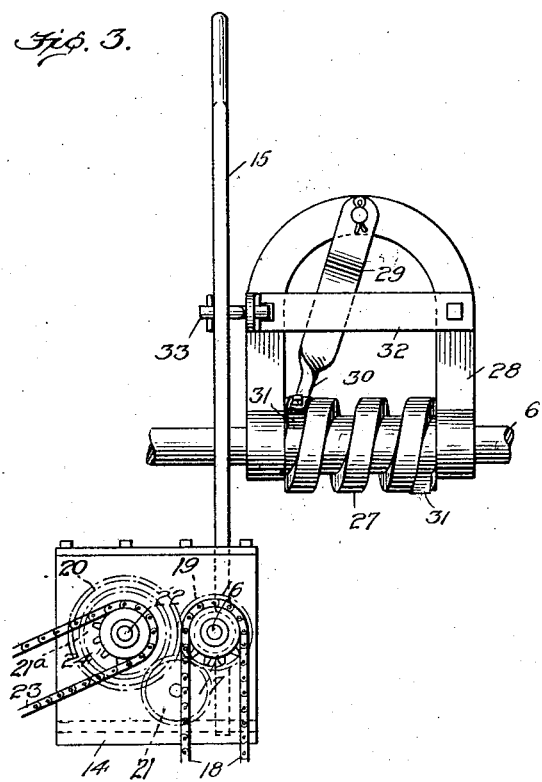
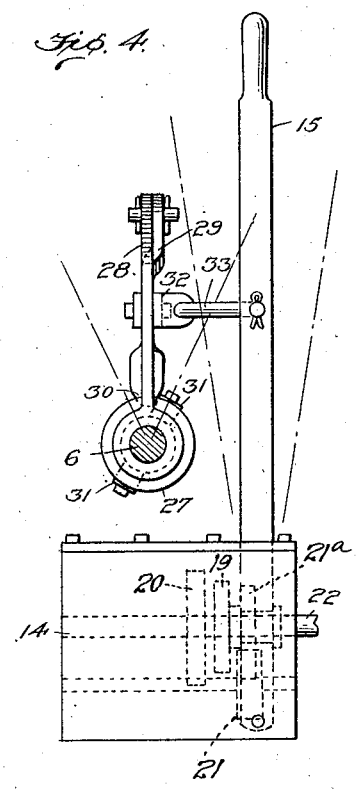
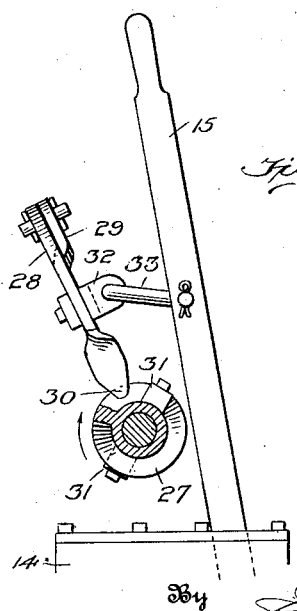

Patented Apr. 26, 1927.

1,626,229

UNITED STATES PATENT OFFICE.

ROBERT A. FONTAINE, OF MARTINSVILLE, VIRGINIA, ASSIGNOR TO R. C. ANDERSON, OF MONTREAT, NORTH CAROLINA.

TRANSMISSION MECHANISM.

Application filed July 13, 1921. Serial No. 484,330.

The invention, broadly considered, relates to power transmission mechanism, and more particularly to means for automatically stopping the rotation of such mechanism at predetermined points and for controlling the direction of rotation of successive movements of said mechanism.

The principal object of my invention, generally stated, is to provide novel means in connection with power transmission devices for automatically limiting the movements of parts operated by said mechanism and to arrange the said means so that the direction of each successive movement of the power transmitting mechanism is positively controlled by the direction of the preceding movement.

Another object of the invention is to devise a transmission mechanism provided with automatic means for controlling each succeeding operation of the said mechanism, the said controlling means being also adapted to limit the extent of movement of said mechanism.

Another object of the invention is to produce a transmission mechanism in which the gear shifting device or lever is automatically returned to neutral position after predetermined rotation of the transmission mechanism, the said automatic means positively preventing the accidental movement of said lever into a position to operate the mechanism in the direction of movement immediately preceding.

Another object of the invention is to provide means in connection with dump body trucks, the said means being operatively interposed between a transmission or gearing mechanism and the dumping mechanism for controlling the lifting or lowering movements of the truck body at predetermined points.

There are other objects of my invention as will hereinafter appear from the more detailed description of the same when taken in connection with the accompanying drawings.

In the drawings, wherein I have illustrated a single embodiment of the invention,—

Figure 1 is a fragmentary plan view of a portion of a truck showing the mechanism for operating the dump body.

Figure 2 is a side elevation of Fig. 1.

Figure 3 is a fragmentary side elevation of the gearing mechanism and the control mechanism for automatically operating the controlling lever.

Figure 4 is a side elevation of the construction shown in Fig. 3.

Figure 5 is a view, similar to Fig. 4, showing the operating mechanism in operating position.

Throughout the specification and drawings like parts are designated by like reference characters.

The numeral 1 designates the truck body, only a portion of which is illustrated in the drawings. It will be understood that any type of truck body mechanism may be employed, since this forms no part of my invention. The carriage for the dump body is designated by the reference numeral 2, said carriage being preferably roller mounted, as shown at 3, on the main body of the truck. In the particular embodiment of the invention the carriage 2 is operated by means of a boom 4, the jaw portions 5 of which are mounted upon a shaft 6. Interposed between each of the pairs of jaws 7 of the boom 4 and fixedly secured to the shaft 6 is a sheave or drum 8 adapted to receive a flexible member or cable 9 one end of which is connected to a transversely extending rod 10 rigidly secured to the carriage 2. The opposite end of the cable 9 extends around a pulley or other suitable mechanism (not shown) and is connected to the bar 10 at the inner end of one of the eyes 11 which, as will be noted, pass through the bar 10 and together form means for connecting both ends of the cable to the said bar.

The shaft 6, hereinbefore referred to, is rotatably mounted in bearings 12 carried by a frame 13 which is mounted on the truck body at a convenient point. A gearing device 14 of any desired construction is mounted intermediate the ends of the frame 13, the said gearing being controlled by a lever 15. It will be understood, of course, that the gearing is adapted to be operated by a power shaft 16 which carries a sprocket 17 over which extends a sprocket chain 18, the said chain being connected to a suitable source of power, preferably the motor or engine used to drive the truck. At its inner end the power shaft 16 carries a gear 19 splined thereon and suitably connected with the lever 15 in order that the gear may be selectively meshed with gears 20 and 21 so as to cause, depending upon the selection, the rotation of the driving shaft 22 in opposite directions. The gear 20 is fastened directly on the shaft 22 while the gear 21 meshes with a gear 21ᵃ likewise on the shaft 22. When the lever 15 is in vertical or neutral position the gear 19 on the power shaft 16 will be out of mesh with the gears 20 and 21 and rotation of the shaft 6 will cease. The shaft 22 is connected to the shaft 6 preferably by means of a chain 23 which passes over the sprocket wheels 24 and 24ᵃ carried by the shafts 22 and 25, respectively, the shaft 25 carrying a worm 25ᵃ meshing with a worm wheel 25ᵇ on a countershaft 25ᶜ journaled beneath the shaft 6 and provided with pinions 25ᵈ which intermesh with the gear wheels 26 rigidly secured to the shaft 6. While I have described in detail the arrangement whereby the gearing is connected to the driven shaft 6, it will be understood that other means may be employed within the scope of my invention. The numeral 25ᵉ designates a housing for the worm gearing.

Rigidly secured to the shaft 6 at a convenient point is a worm 27, and pivotally mounted upon the shaft is a U-shaped frame 28, the arms of the U being adapted to engage the shaft on opposite sides of the worm 27. Pivotally secured to the upper portion of the frame is a finger 29, the said finger being of such length as to permit the lower end 30 thereof to engage within the screw thread of the worm 27.

At appropriate points in the worm I provide stops 31 the purpose of which will be hereinafter set forth. Connected to the arms of the frame 28 is a plate 32, and pivotally connected to the said plate, by means of a link or bar 33, is the lever 15 hereinbefore described.

When the device is in operation, that is, in the particular embodiment of the invention, when the operator desires to dump the truck body, the lever 15 is moved into the position which is illustrated in Fig. 5. This operation meshes the gear 19 carried by the shaft 16 with the gear 20 which is directly carried by the shaft 22. The rotation of the shaft 22 will cause a rotation of the shaft 6 in a clockwise direction, and this rotation of said shaft will carry the pivoted member or finger 29 from the position shown in Fig. 3 longitudinally of the shaft until the stop 31 at the right hand end of the worm 27 engages the end 30 of the said finger. As soon as this stop comes into engagement with the finger 29 the frame 28 will be rotated on the shaft 6 into the vertical or upright position, thus instantly throwing the gear 19 out of mesh with the gear 20 and preventing further rotation of the shaft 6 in the direction of rotation in which the shaft was traveling. Since the finger 29 will remain in engagement with the stop 31 any attempt of the operator to again mesh the gears 19 and 20 will be prevented by the said engagement of the finger 29 with the stop 31. When the operator wishes to return the truck body to normal position the lever 15 is moved in the opposite direction, which movement is not prevented by the frame and finger, and the gear 19 is now brought into mesh with the idler gear 21 meshing with the gear 21ᵃ, causing a reverse rotation of the shaft 6. The finger 29 then travels in the opposite direction along the worm until it contacts with the stop 31 at the opposite or left hand end of the worm when this stop, through its engagement with the said finger, throws the lever 15 into vertical or neutral position.

I claim:—

1. In a truck dump body moving mechanism, a drive shaft, a driven shaft, a worm on the driven shaft equipped with stops, a lever control mechanism for effecting the rotation of the driven shaft in one direction or the other, a frame rotatably mounted on the driven shaft in straddling relation to the worm thereon, an operative connection between the frame and the lever, and a finger pivoted on the frame with its free end traveling along the worm and adapted to be engaged by the stops for swinging the frame and moving the lever when the driven shaft has made a predetermined number of revolutions.

2. In a truck body moving mechanism, a driven shaft arranged transversely of the truck body, a longitudinally arranged drive shaft, a transmission gearing mechanism for connecting said shafts, the transmission mechanism including a movably mounted control lever swingable in a plane parallel to the drive shaft, means rockably mounted on the driven shaft and operatively connected with the lever, and worm means on the driven shaft constantly engaging said first named means and arranged to move the same when the driven shaft has made a predetermined number of revolutions in either direction.

3. In a transmission mechanism, the combination of a drive shaft, a driven shaft, a reversible transmission means for connecting the shafts for effecting rotation of the driven shaft in a selected direction, said transmission means including a control lever, a frame rotatably mounted, a link connection between the frame and the lever, a worm on the driven shaft equipped with stops, and a finger pivoted on the frame for movement longitudinally of the driven shaft and having its free end engaging the worm and adapted to engage said stops.

4. In a transmission mechanism of the character described, a drive shaft, a driven shaft, mechanism operatively connecting said shafts including a lever, a rockably mounted support operatively connected with the lever, a worm on the driven shaft provided with stops, and a member pivoted on said support and engaging the worm and adapted to be engaged by said stops when the driven shaft has made a predetermined number of revolutions.

5. In a transmission mechanism, the combination with a driving shaft, of a driven shaft, a lever movable in opposite directions for controlling the direction of rotation of said driven shaft, and means mounted on said driven shaft for disengaging the same from said driving shaft, said rotatable means including a frame with a pivoted operating member thereon, and means for preventing movement of said frame longitudinally of said driven shaft.

6. In a transmission mechanism, the combination with a driving shaft, of a driven shaft, a movable lever for operatively connecting and disconnecting the same, and means carried by said driven shaft for moving said lever to inoperative position, said means including a worm connected to said driven shaft and carrying stops, a frame rotatably mounted on said shaft adjacent said worm, a connection between the frame and lever, and a finger on the frame engaging the worm and engageable by said stops.

7. In a transmission mechanism, the combination with a driving shaft, of a driven shaft, a movable lever for operatively connecting and disconnecting said shafts, and means carried by said driven shaft for moving said lever to inoperative position, said means comprising a worm equipped with stops, a rotatable frame straddling the worm, a pivoted finger carried by said frame and movable by said worm to engage the stops.

8. In a transmission mechanism for controlling the lifting and lowering movements of a truck body, the combination with a drive shaft disposed longitudinally of the truck body, of a driven shaft arranged transversely of said truck body, a controlling lever having movement longitudinally of the truck body and transversely of the driven shaft for operatively connecting and disconnecting said shafts, a frame movably mounted on said driven shaft, a movable member pivoted to said frame and having a portion operatively engaged for movement by the driven shaft, and stop members for limiting the movement of said pivoted member after a predetermined path of travel, each of said stop members serving to limit the movement of the controlling lever in all directions other than that which will cause the driven shaft to be rotated in the opposite direction to its preceding direction of travel.

In testimony whereof I affix my signature.

ROBERT A. FONTAINE.